Patented Apr. 22, 1947

2,419,198

UNITED STATES PATENT OFFICE 2,419,198

PROCESS FOR DEHYDROHALOGENATING HALOGENATED ORGANIC COMPOUNDS

Roy E. Bowman, Blacksburg, Va.

No Drawing. Application September 2, 1943, Serial No. 500,972

5 Claims. (Cl. 260—668)

(Granted under the act of March 3, 1883, as amended April 30, 1928; 370 O. G. 757)

The invention described herein may be manufactured and used by or for the Government for governmental purposes without the payment to me of any royalty thereon.

This invention relates to method of treating halogenated hydrocarbons and other halogenated organic compounds in which halogen has replaced hydrogen attached to carbon to convert them into other organic compounds wherein the halogen is eliminated in whole or in part.

More particularly the present invention relates to treating chlorinated hydrocarbons and other compounds in which chlorine has replaced a hydrogen atom or atoms, in order to eliminate chlorine and hydrogen therefrom in the form of hydrochloric acid or hydrochloric acid gas.

Aside from providing a novel process for eliminating chlorine from combination in organic compounds, the invention also provides a method of producing unsaturated organic compounds from saturated compounds, or of introducing further degree of unsaturation in an already unsaturated compound.

The invention also relates to a catalyst or reagent which is useful in eliminating a halogen from organic compounds in the form of the hydrogen halide, for example, in eliminating chlorine in the form of hydrochloric acid or hydrochloric acid gas from organic compounds of the type mentioned above.

In general, according to the method or process of the invention, halogenated hydrocarbons, or other halogenated organic compounds in which halogen replaces one or more hydrogen atoms, are brought, either in the liquid phase or vapor or gaseous phase, into contact with a complex of magnesium metal and magnesium iodide, the said complex being described more fully hereinafter. The temperature at which this contact is made will depend upon the particular halogenated compound or compounds treated, so that general ranges of temperature with defined specific upper and lower limits in terms of thermometer readings are not readily stated. However, the temperature at which the contact, or process, is carried out may be stated in other terms which gives a surer guide. The appearance of the hydrogen halide in the liquid or gaseous reaction product may be easily detected by well known tests, and such appearance may be used as an index of the temperature to be used. For example, hydrochloric acid can be detected very easily by the white fumes of ammonium chloride produced when ammonia gas evaporating from aqua ammonia is brought into contact with it, or hydrochloric gas may be detected by permitting the vapors or gases to escape into the atmosphere where the hydrochloric acid forms a white fume which consists of minute drops of a solution of the gas in the moisture of the air. These tests for hydrochloric acid are well known and definite. It will be understood, therefore, that the temperature at which to carry out the process for any material is easily ascertained by gradually increasing the temperature of contact until hydrochloric acid or hydrochloric acid gas makes its appearance. The appearance of the hydrochloric acid, therefore, becomes the index of the temperature when the chlorinated compounds are treated.

The complex of magnesium metal and magnesium iodide which is used in practicing the invention is prepared in the same manner as this complex is prepared for use in preparing organometallic compounds by the well known Grignard reaction. This complex of magnesium metal and magnesium iodide is referred to herein as iodized magensium for the sake of brevity. This complex is well known in the synthesis of organometallic compounds according to the Grignard Reaction and was discovered by Baeyer in 1904 who showed that the Grignard reagent (organometallic compounds) formed with greater ease if the magnesium is previously heated with a small proportion of iodine. In an article in volume 38 of Berichte der Deutschen Chemischen Gesellschaft, at page 2759, Baeyer describes a mode of preparation of the iodized magnesium referred to by heating magnesium with a small proportion of iodine. The same article indicates that 10 grams of magnesium filings are heated in a long neck round flask of about 150 cc. capacity, the heating being done over a flame with continuous turning and swinging, and that five grams of iodine are introduced in small portions, in such a way that a succeeding addition is only made if the iodine previously added has disappeared. It is indicated in the said article that the temperature must be high, but not so high that the mass commences to melt, and that the operation requires from ¼ to ½ hour with the indicated quantity of magnesium. The product, the iodized magnesium, is a mat gray powder which becomes brown with time.

While the present invention makes use of iodized magnesium which has heretofore been used in forming organo-metallic compounds according to the Grignard reaction, it is to be understood that the chemical reactions involved in the present invention are not Grignard reactions.

In the Grignard reaction, the magnesium enters into reaction with an organic halide to form an organic magnesium halide of the type R—Mg—X, where R is an organic radical, such as $CH_3$, $C_2H_5$ etc.; and X, a halogen such as iodine and chlorine. There is no splitting off hydrogen halide, for example, hydrochloric acid in the Grignard reaction. In contrast to the Grignard reaction, the reactions according to the present invention evolves hydrochloric acid arising from the removal of chlorine from the compound or compounds treated. In the Grignard reaction, the magnesium of the iodized magnesium actually enters into combination with the organic halide to form an organo-magnesium halide, whereas in the present invention the action of the iodized magnesium is catalytic in nature, the effect being the splitting off of hydrogen halide from the organic halides or halogenated organic compounds. The catalyst in the present invention, therefore, brings about dehydrohalogenation, i. e. the removal of a hydrogen halide from the molecules subjected to its action.

The following examples are given as illustrative of the invention, it being understood, however, that the invention is not restricted in scope to them.

*Example 1*

Iodized magnesium, a complex of magnesium metal and magnesium iodide above described, is placed in pure benzyl chloride, without anhydrous ethyl ether or other anhydrous solvent. It is to be noted here that the Grignard reaction uses anhydrous ether as the medium in which the reaction is conducted, whereas in the present invention anhydrous ether is not employed. As the reaction is catalytic in nature, the proportion of iodized magnesium is not critical, and may consist of a fractional part by weight of the benzyl chloride employed.

The benzyl chloride and iodized magnesium are advantageously placed together in a flask equipped with a reflux condenser, owing to the fact that, in this instance, the reaction is exothermic after it has been initiated. Provision, therefore, must also be made for cooling the flask and contents to control the rate of reaction after it is under way. On warming the contents of the flask, an exothermic reaction takes place accompanied by the release of hydrochloric acid gas. The contents of the flask are cooled to moderate the reaction. During the course of the reaction, the magnesium has a bright appearance, and the reaction appears to be a catalytic one. The organic reaction product is soluble in usual organic solvents and is of an unsaturated nature. The reaction appears to proceed according to the following equation:

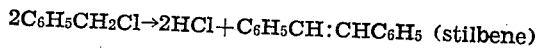

*Example 2*

According to this example, monochloracetic acid is placed in a flask together with the iodized magnesium described. The mixture is warmed until the monochloracetic acid is melted and at about 75° C. a vigorous endothermic splitting off of hydrochloric acid gas commences. The reaction product gradually changes to a mass of white crystals which do not melt at the temperature of boiling water. The said white mass is of acidic nature, and easily soluble in water. The reaction appears to proceed according to the following equation:

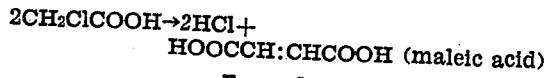

*Example 3*

The following are mentioned as other materials for carrying out the splitting off of hydrochloric acid according to the invention: (a) benzyl chloride and methyl chloride together with iodized magnesium; (b) methyl chloride and ethylene dichloride together with iodized magnesium; (c) ethyl chloride alone with iodized magnesium; and (d) ethylene dichloride alone with iodized magnesium. The reactions of the above appear to proceed respectively according to the following equations:

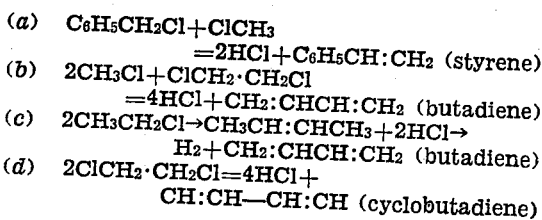

The expression "iodized magnesium" appearing in the appended claims refers to the product formed by heating magnesium metal, such as magnesium filings or turnings, in the presence of solid iodine or of the vapors of iodine, in such proportions with respect to the magnesium metal that the latter does not wholly react chemically with the iodine.

I claim:

1. The process for splitting off a hydrogen halide from organic compounds in which a halogen has replaced hydrogen attached to carbon, the said process comprising contacting said compounds, in the absence of solvents therefor, with iodized magnesium as a dehydrohalogenation catalyst, while the said compounds are at least at a temperature sufficiently elevated to initiate a reaction accompanied by the evolution of a hydrogen halide.

2. The process for splitting off hydrochloric acid from an organic compound in which chlorine has replaced hydrogen attached to carbon, the said process comprising contacting said compound, in the absence of a solvent therefor, with iodized magnesium as a dehydrohalogenation catalyst, while the said compound is at least at a temperature sufficiently elevated to initiate a reaction accompanied by the evolution of hydrochloric acid.

3. The process for splitting off hydrochloric acid from a chlorinated hydrocarbon, the said process comprising contacting said chlorinated hydrocarbon, in the absence of a solvent therefor, with iodized magnesium as a dehydrohalogenation catalyst, while the said chlorinated hydrocarbon is at least at a temperature sufficiently elevated to initiate a reaction accompanied by the evolution of hydrochloric acid.

4. In the art of splitting off hydrochloric acid from benzyl chloride, the method which comprises contacting benzyl chloride, in the absence of a solvent therefor, with iodized magnesium as a dehydrohalogenation catalyst, while the said benzyl chloride is at least at a sufficiently elevated temperature to initiate a reaction accompanied by the evolution of hydrochloric acid.

5. In the art of splitting off hydrochloric acid from a mixture of benzyl chloride and methyl chloride, the method which comprises contacting a mixture of benzyl chloride and methyl chloride, in the absence of a solvent for said mixture, with iodized magnesium as a dehydrohalogenation catalyst, while the said mixture is at least at a sufficiently elevated temperature to initiate a reaction accompanied by the evolution of hydrochloric acid.

ROY E. BOWMAN.

REFERENCES CITED

The following references are of record in the file of this patent:

UNITED STATES PATENTS

| Number | Name | Date |
|---|---|---|
| 2,288,865 | Baehr et al. | July 7, 1942 |
| 2,243,191 | Cantzler et al. | May 27, 1941 |
| 2,261,168 | Lott | Nov. 4, 1941 |
| 2,245,547 | Pallack | June 10, 1941 |

FOREIGN PATENTS

| Number | Country | Date |
|---|---|---|
| 555,933 | German | Aug. 4, 1932 |

OTHER REFERENCES

Gilman et al., Jour. A. Chem. Soc., vol. 50, pp. 3336-8.

Krestinski, Berichte (Deutsch. Chem. Gesell.), vol. 55, pp. 2757-9.

Shoruigin et al. (A), Chem. Abs., vol. 26, 1265-6 (1932); also in Berichte, vol. 64B, 2584-90 (1931). (Pat. Off. Lib.)

Shoruigin et al. (B), Chem. Abs., vol. 27, 5717-8 (1933) also in Berichte, vol. 66B, 1426-31 (1933). (Pat. Off. Lib.)

Gilman et al., Chem. Abs., vol. 22, 1134-5 (1928), also in Rec. Trav. Chim., vol. 47, 19-27 (1928). (Pat. Off. Lib.)